US012221834B1

(12) United States Patent
Mah et al.

(10) Patent No.: US 12,221,834 B1
(45) Date of Patent: Feb. 11, 2025

(54) LADDER STABILIZING ASSEMBLY

(71) Applicants: James Mah, Las Vegas, NV (US); Paul Dinh, Round Rock, TX (US)

(72) Inventors: James Mah, Las Vegas, NV (US); Paul Dinh, Round Rock, TX (US)

( * ) Notice: Subject to any disclaimer, the term of this patent is extended or adjusted under 35 U.S.C. 154(b) by 897 days.

(21) Appl. No.: 17/364,627

(22) Filed: Jun. 30, 2021

(51) Int. Cl.
*E06C 7/42* (2006.01)

(52) U.S. Cl.
CPC .................................... *E06C 7/423* (2013.01)

(58) Field of Classification Search
CPC ............... E06C 7/423; E06C 1/20; E06C 5/42
See application file for complete search history.

(56) References Cited

U.S. PATENT DOCUMENTS 88,842 A * 4/1869 Burbank ................. E06C 7/423 182/172
198,897 A * 1/1878 Middleton ................ E06C 1/12 182/108
559,626 A * 5/1896 Snell ......................... E06C 1/12 182/180.1
3,165,169 A * 1/1965 Machen .................... E06C 1/22 182/171
3,744,192 A * 7/1973 Burnett ................... E02D 5/808 52/166
4,007,807 A * 2/1977 Pogwizd ................... E06C 7/46 182/109
4,130,181 A * 12/1978 McCallum ................ E06C 1/20 182/169
4,632,220 A * 12/1986 Murrell ..................... E06C 7/44 182/172
4,792,016 A * 12/1988 Ingalsbe ................... E06C 1/34 182/93
4,964,488 A * 10/1990 Stewart ..................... E06C 1/20 182/172
5,067,588 A * 11/1991 Bendickson ............ E06C 7/188 24/194
5,529,145 A * 6/1996 Allred ..................... E06C 7/188 182/206

(Continued)

FOREIGN PATENT DOCUMENTS

CN 109138821 A * 1/2019 ............... E06C 1/18
GB 2069579 A * 8/1981 ............... E06C 1/34

(Continued)

*Primary Examiner* — Jessica L Laux
*Assistant Examiner* — Kathleen M. McFarland

(57) ABSTRACT

Ladder stabilizing assemblies are disclosed. The ladder stabilizing assemblies include a series of cords; at least two ground anchors; at least two ground anchor clamps; a series of ladder connectors; and a tightening buckle. The ladder stabilizing assemblies provide two cords attached to the top and bottom portions of the right leg of the ladder, which are secured to the ground through a first ground anchor. The ladder stabilizing assemblies provide two additional cords attached to the top and bottom portions of the left leg of the ladder, which are secured to the ground through a second ground anchor. The assemblies further include a fifth cord that connects the first and second ground anchors—which may be manually tightened using the tightening buckle. A ladder is stabilized when each of the cords are tightened between the ladder and the ground anchors (and between the two ground anchors).

1 Claim, 5 Drawing Sheets

(56) References Cited

U.S. PATENT DOCUMENTS

| | | | | | |
|---|---|---|---|---|---|
| 5,682,960 | A * | 11/1997 | Mobley | E06C 7/00 182/129 |
| 5,868,222 | A * | 2/1999 | Charbonneau | E06C 7/423 182/172 |
| 5,896,945 | A * | 4/1999 | Boelling | E06C 7/48 182/129 |
| 6,672,427 | B1 * | 1/2004 | Sheffield | E06C 7/42 182/172 |
| 6,955,243 | B1 * | 10/2005 | Huff | E06C 7/46 52/159 |
| 8,590,671 | B2 * | 11/2013 | Potter | E06C 1/12 182/171 |
| 8,607,932 | B2 * | 12/2013 | Cooper | E06C 7/423 182/172 |
| 8,695,761 | B1 * | 4/2014 | Berkbuegler | E06C 7/188 182/115 |
| 9,187,954 | B1 * | 11/2015 | Parsons | E06C 7/48 |
| 10,415,312 | B1 * | 9/2019 | Conroy | E06C 7/188 |
| 11,125,015 | B2 * | 9/2021 | Goudreault | E06C 7/50 |
| 11,452,279 | B2 * | 9/2022 | Specha | A01K 1/035 |
| D979,098 | S * | 2/2023 | Park | D25/68 |
| 2005/0166468 | A1 * | 8/2005 | Pierce | E04H 9/14 52/23 |
| 2006/0118360 | A1 * | 6/2006 | Rivers | E06C 7/188 182/18 |
| 2007/0289812 | A1 * | 12/2007 | Feemster | E06C 7/46 182/107 |
| 2008/0029341 | A1 * | 2/2008 | Cooper | E06C 7/423 182/107 |
| 2010/0038172 | A1 * | 2/2010 | Ralston | E06C 7/18 182/107 |
| 2010/0147623 | A1 * | 6/2010 | Pocos | E06C 7/423 102/200 |
| 2011/0114418 | A1 * | 5/2011 | Blazin | E06C 7/06 182/129 |
| 2011/0290587 | A1 * | 12/2011 | Blazin | E06C 7/188 182/107 |
| 2012/0261214 | A1 * | 10/2012 | Dondurur | E06C 7/48 182/106 |
| 2013/0233993 | A1 * | 9/2013 | Striepling | E06C 7/188 248/309.1 |
| 2015/0218884 | A1 * | 8/2015 | Kempthorne | E06C 7/00 182/107 |
| 2015/0259982 | A1 * | 9/2015 | Maragliano | E06C 7/505 29/525.01 |
| 2015/0361722 | A1 * | 12/2015 | Chick | E06C 7/188 182/116 |
| 2020/0063492 | A1 * | 2/2020 | McCormick | E06C 7/10 |
| 2020/0102789 | A1 * | 4/2020 | Young | E06C 1/12 |
| 2021/0198947 | A1 * | 7/2021 | Goudreault | E06C 7/423 |
| 2021/0254407 | A1 * | 8/2021 | Elmore | E06C 7/188 |
| 2021/0285288 | A1 * | 9/2021 | Harris | F16M 13/02 |
| 2021/0372200 | A1 * | 12/2021 | Walsh | A62B 1/06 |
| 2021/0381311 | A1 * | 12/2021 | Bjørnevaag | E06C 7/48 |
| 2022/0098815 | A1 * | 3/2022 | Zhou | E04B 1/34347 |
| 2023/0021230 | A1 * | 1/2023 | Santana | E06C 7/188 |
| 2023/0143839 | A1 * | 5/2023 | Brandon | E06C 7/188 182/107 |

FOREIGN PATENT DOCUMENTS

| | | | | |
|---|---|---|---|---|
| GB | 2329212 | A * | 3/1999 | E06C 1/22 |
| GB | 2416800 | A * | 2/2006 | E06C 7/423 |
| GB | 2428730 | A * | 2/2007 | E06C 7/188 |
| GB | 2432621 | A * | 5/2007 | E06C 7/188 |
| WO | WO-2007015110 | A1 * | 2/2007 | E06C 7/188 |
| WO | WO-2017151527 | A1 * | 9/2017 | E06C 1/20 |
| WO | WO-2023244726 | A1 * | 12/2023 | |

* cited by examiner

LADDER STABILIZING ASSEMBLY

FIELD OF THE INVENTION

The field of the present invention relates to ladder stabilizing assemblies and devices and, more particularly, to stabilizing assemblies and devices that are specifically adapted for extension ladders.

BACKGROUND OF THE INVENTION

Accidental falling from elevated places is among the most common causes of serious injury in the construction and retail industries. In the United States alone, every two days, on average, work-related ladder falls result in a death and more than 180 injuries, resulting in $24 billion a year in related costs, including work loss and expenses for medical, legal, liability, and pain/suffering, according to the National Institute for Occupational Safety and Health (NIOSH). At this time, the Occupational Safety and Health Administration (OSHA) standards do not require fall protection for workers on fixed ladders below 24 feet or on portable ladders. Nevertheless, various employers, contractors, workers, and other stakeholders continue to pursue solutions to reduce these types of injuries. As the following will demonstrate, the ladder stabilizing assemblies and devices of the present invention address such needs in the construction and retail industries.

SUMMARY OF THE INVENTION

According to certain preferred aspects of the invention, ladder stabilizing assemblies are disclosed. The ladder stabilizing assemblies include a series of cords (e.g., at least five cords); at least two ground anchors; at least two ground anchor clamps; a series of ladder connectors; and a tightening buckle. The invention provides that the ladder stabilizing assemblies include a first pair of cords, with a first cord attached to the bottom portion of the right leg of the ladder and a second cord attached to the top portion of the right leg of the ladder, with both cords being further secured to the ground through a first ground anchor (positioned to the right of the right leg of the ladder). The ladder stabilizing assemblies include a second pair of cords, with a third cord attached to the bottom portion of the left leg of the ladder and a fourth cord attached to the top portion of the left leg of the ladder, which are both further secured to the ground through a second ground anchor (positioned to the left of the left leg of the ladder). The assemblies further include a fifth cord that connects the first and second ground anchors-which may be manually tightened using the tightening buckle. As described and illustrated herein, a ladder is stabilized when each of the five cords are tightened (pulled taut) between the ladder and the ground anchors (and between the two ground anchors through the fifth cord). Such stabilization is achieved, in part, through compressive forces exerted towards the ground surface, which the assemblies described herein are configured to generate and maintain.

The above-mentioned and additional features of the present invention are further illustrated in the Detailed Description contained herein.

DETAILED DESCRIPTION OF THE INVENTION

Figure 1:
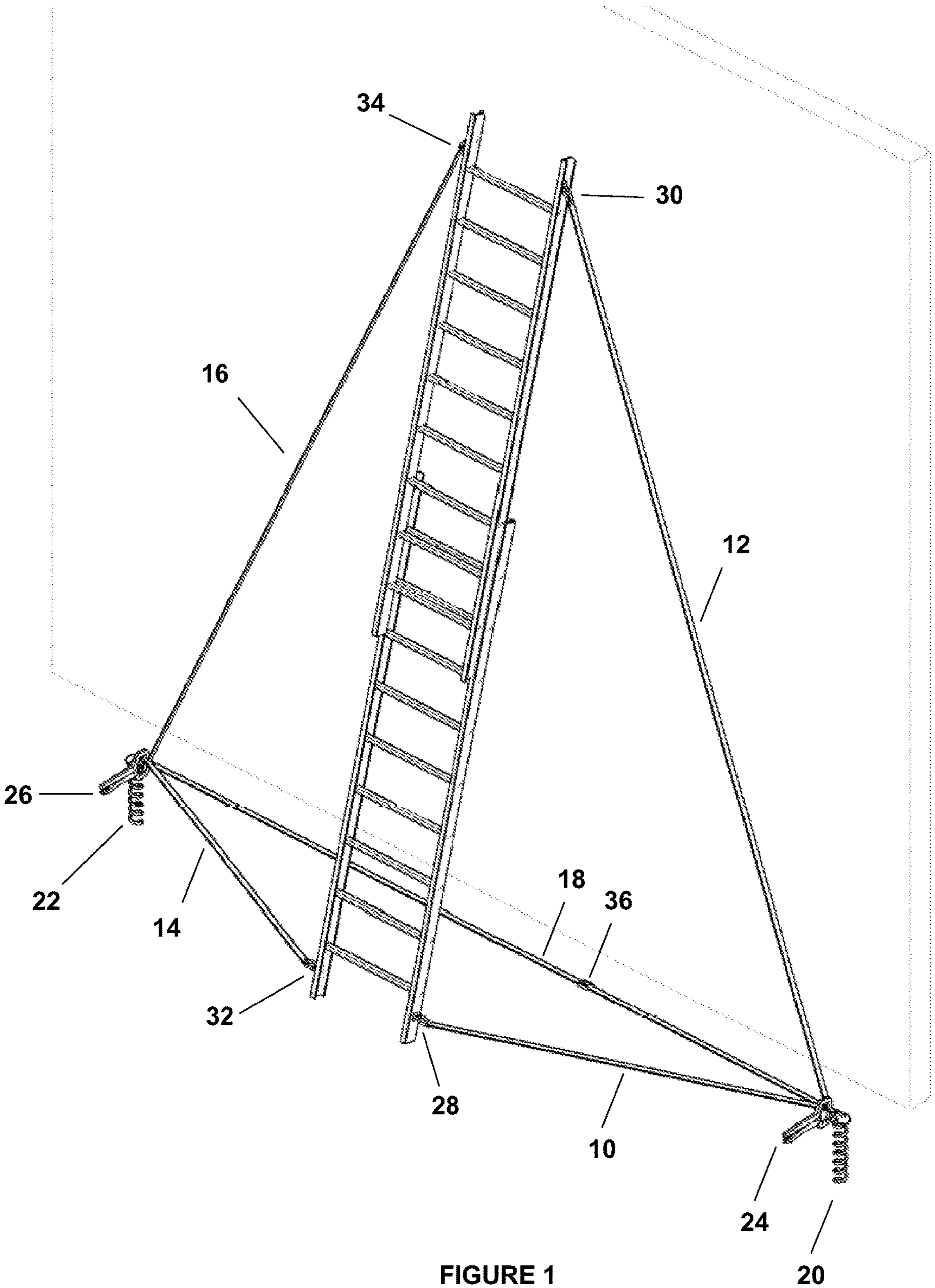
FIG. 1 is an illustration of the ladder stabilizing assemblies described herein.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

According to certain preferred embodiments of the present invention, ladder stabilizing assemblies are disclosed. The ladder stabilizing assemblies include a series of cords; at least two ground anchors; at least two ground anchor clamps; a series of ladder connectors; and a tightening buckle. The ladder stabilizing assemblies provide two cords attached to the top and bottom portions of the right leg of the ladder, which are secured to the ground through a first ground anchor. The ladder stabilizing assemblies provide two additional cords attached to the top and bottom portions of the left leg of the ladder, which are secured to the ground through a second ground anchor. The assemblies further include a fifth cord that connects the first and second ground anchors-which may be manually tightened using the tightening buckle. A ladder is stabilized when each of the cords are tightened (pulled taut) between the ladder and the ground anchors (and between the two ground anchors). Such stabilization is achieved, in part, through compressive forces exerted towards the ground surface, which the assemblies described herein are configured to generate and maintain.

More specifically, referring now to FIGS. 1-5, the ladder stabilizing assemblies of the present invention include a first cord 10, a second cord 12, a third cord 14, a fourth cord 16, and a fifth cord 18. According to certain preferred embodiments of the present invention, the assemblies further include at least two ground anchors, including a first ground anchor 20 and a second ground anchor 22. In addition, the assemblies preferably include a ground anchor clamp for each of the first ground anchor 20 and second ground anchor 22, such as a first ground anchor clamp 24 and a second ground anchor clamp 26. The ladder stabilizing assemblies of the present invention further include a series of ladder connectors, including a first ladder connector 28, a second ladder connector 30, a third ladder connector 32, and a fourth ladder connector 34. Still further, according to certain preferred embodiments of the present invention, the ladder stabilizing assemblies include a tightening buckle 36, positioned within (in-line with) the fifth cord 18.

The invention provides that the first end of the first cord 10 is connected to a bottom portion of a right leg of a ladder through the first ladder connector 28; a second end of the first cord 10 is connected and secured to the first ground anchor 20 through the first ground anchor clamp 24; and the first ground anchor 20 is configured to be secured to a ground surface (as described further below). In addition, the invention provides that a first end of the second cord 12 is connected to a top portion of the right leg of the ladder through the second ladder connector 30; and a second end of the second cord 12 is connected and secured to the first ground anchor 20 through the first ground anchor clamp 24. The invention provides that the first ground anchor 20 is secured to the ground surface at a distance from the ladder, such that the first cord 10 and second cord 12 are tight, i.e., the first cord 10 and the second cord 12 are taut between the right leg of the ladder and the first ground anchor 20.

With respect to the left side of the ladder, the invention provides that a first end of the third cord 14 is connected to a bottom portion of the left leg of the ladder through the third ladder connector 32; a second end of the third cord 14 is connected and secured to the second ground anchor 22 through the second ground anchor clamp 26; and the second ground anchor 22 is configured to be secured to the ground surface. In addition, the invention provides that a first end of the fourth cord 16 is connected to a top portion of the left leg of the ladder through the fourth ladder connector 34; and a second end of the fourth cord 16 is connected and secured to the second ground anchor 22 through the second ground anchor clamp 26. Likewise, the invention provides that the second ground anchor 22 is secured to the ground surface at a distance from the ladder, such that the third cord 14 and fourth cord 16 are tight, i.e., the third cord 14 are fourth cord 16 are taut between the left leg of the ladder and the second ground anchor 22.

According to yet further embodiments of the present invention, a first end of the fifth cord 18 is connected and secured to the first ground anchor 20 through the first ground anchor clamp 24 and a second end of the fifth cord 18 is connected and secured to the second ground anchor 22 through the second ground anchor clamp 26. The invention provides that the fifth cord 18 includes the tightening buckle 36, which is configured to manually tighten or loosen the fifth cord 18 between the first ground anchor 20 and second ground anchor 22. That is, the tightening buckle 36 may be used to make the fifth cord 18 more or less taut, as necessary, between the first ground anchor 20 and second ground anchor 22. As described and illustrated herein, a ladder is stabilized when the top side of the ladder is resting against a wall surface, and each of cords 10, 12, 14, and 16 are tightened and pulled taut between the ladder and the ground anchors 20/22, and between the two ground anchors 20/22 through the fifth cord 18.

The invention provides that the two ground anchors 20/22 are preferably secured to the ground surface a distance from the wall surface that is less than the distance that the bottom of the ladder sits on ground surface. For example, if the ladder is sitting on a ground surface about 6 feet from a wall surface, the two ground anchors 20/22 may be secured to the ground surface about 3 feet from the wall surface. This way, the fifth cord 18 is allowed to be positioned between the ladder and the wall surface (as illustrated in FIG. 1).

Figure 2:
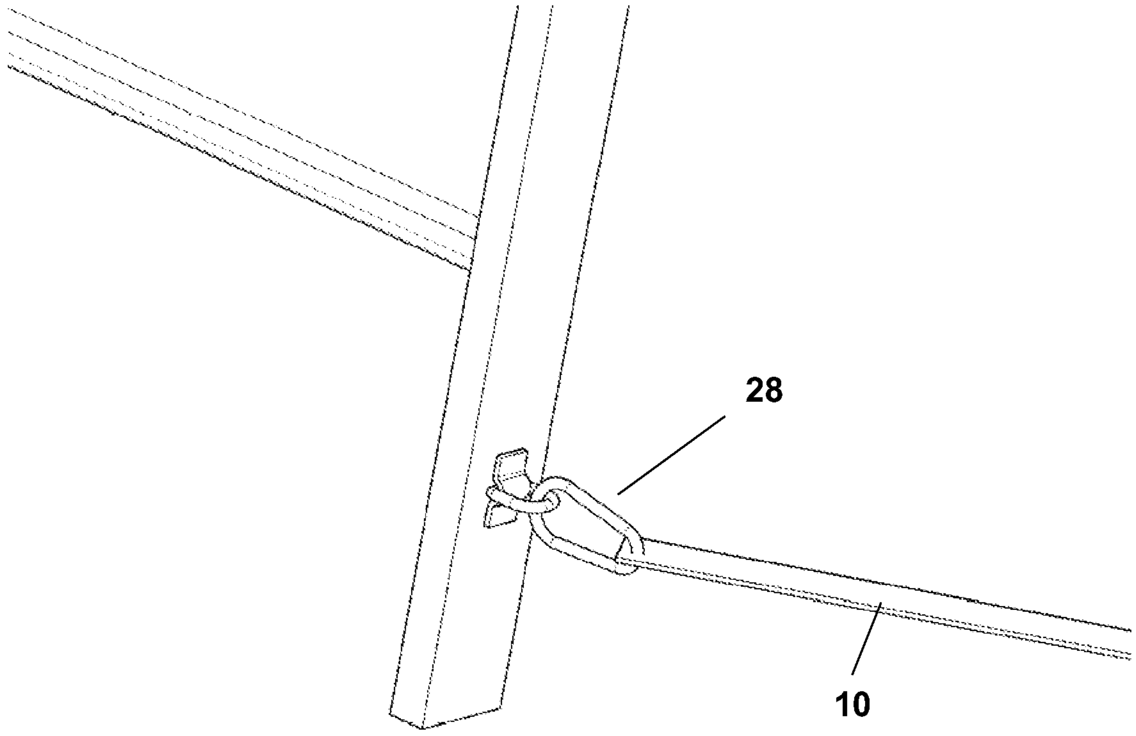
FIG. 2 is an illustration of a ladder connector that is a part of and used in the assemblies described herein.

The invention provides that the first ladder connector 28, second ladder connector 30, third ladder connector 32, and fourth ladder connector 34 may consist of a clasp, which is configured to be connected to a loop, aperture, or other surface on each leg of the ladder (e.g., FIG. 2). In addition to clasps, the invention provides that such connectors may also be configured as hooks, clamps, screw connections, and other suitable mechanical attachment means.

Figure 3:
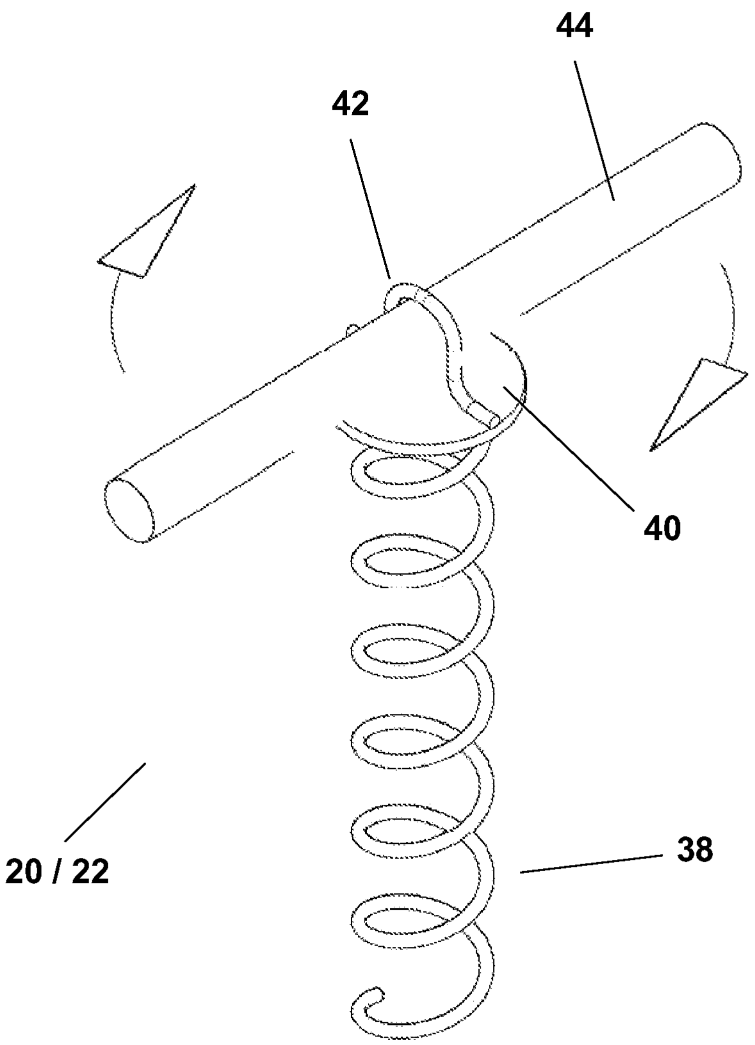
FIG. 3 is an illustration of a ground anchor that is a part of and used in the assemblies described herein.

According to yet further preferred embodiments, the invention provides that each of the first ground anchor 20 and second ground anchor 22 may include a corkscrew element 38 that is configured to be rotated into the ground surface (FIG. 3). Still further, according to such embodiments, the invention provides that each of the first ground anchor 20 and second ground anchor 22 include a top surface 40 and a loop 42 attached to the top surface 40. In such embodiments, the invention provides that the ladder stabilizing assembly further includes a rod 44 that is configured to be disposed through the loop 42 on the top surface 40 of the each of the first ground anchor 20 and the second ground anchor 22, which may be manually rotated to assist in attaching the first ground anchor 20 and the second ground anchor 22 to the ground surface, i.e., it may be manually rotated to screw the first and second ground anchors 20/22 into the ground surface. When the ground anchors 20/22 are secured to particularly hard surfaces, e.g., concrete, wood, or other hard surfaces, the ground anchors 20/22 may be secured to such ground surfaces using jigs and/or other tools.

Figure 4:
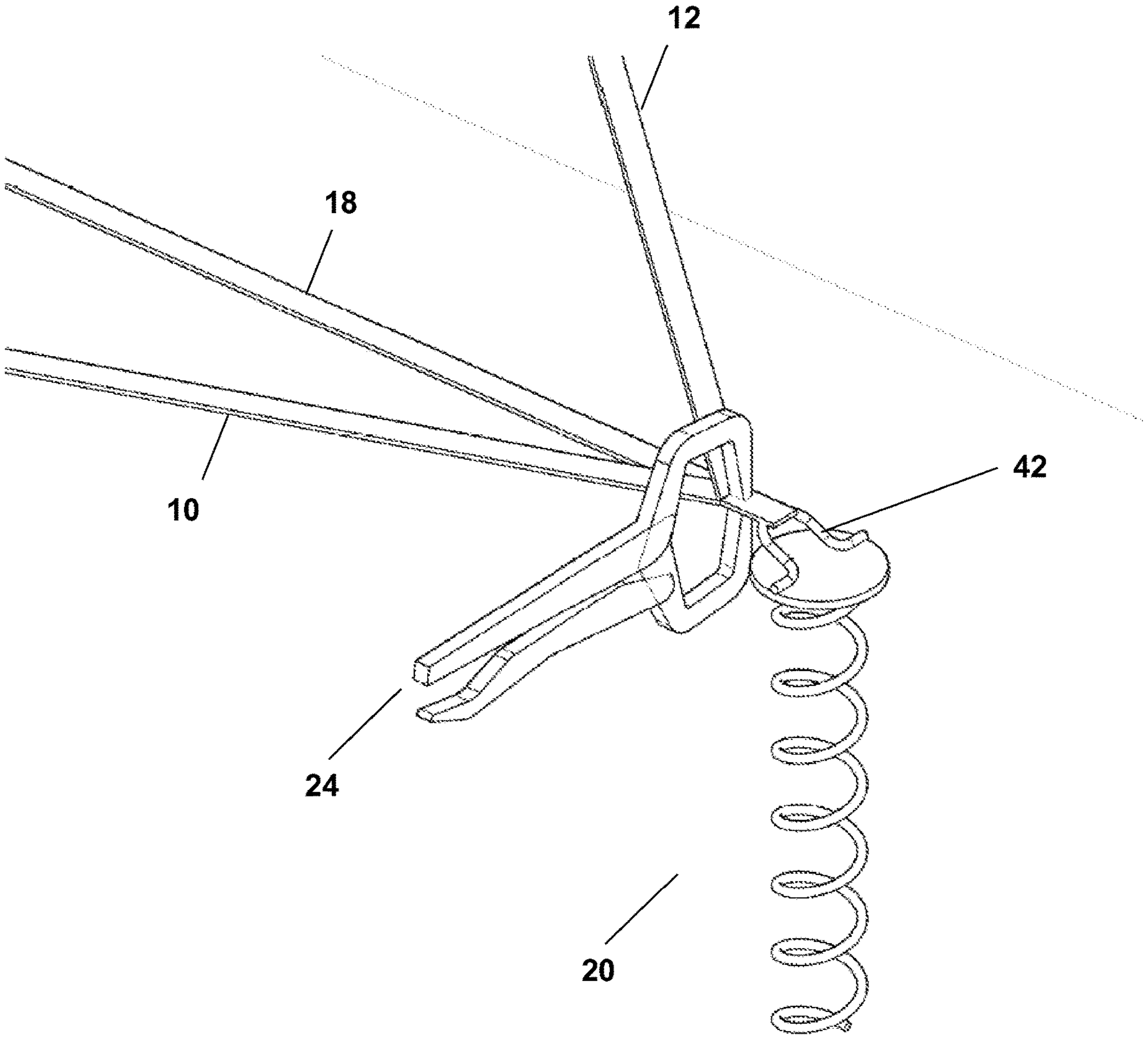
FIG. 4 is an illustration of a ground anchor clamp that is a part of and used in the assemblies described herein.
Figure 5:
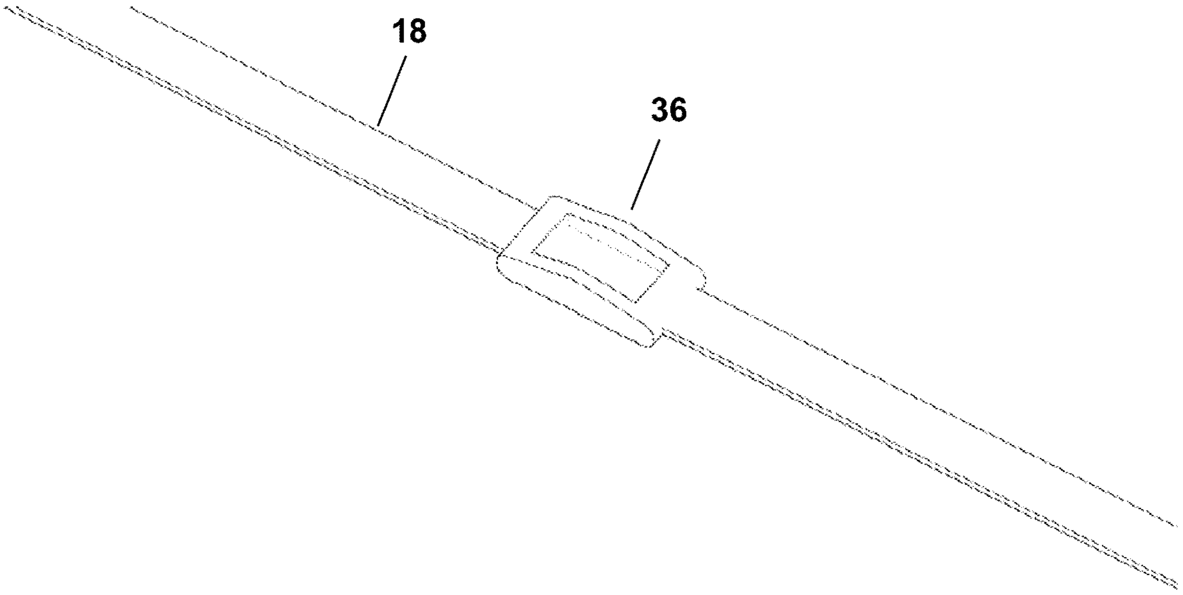
FIG. 5 is an illustration of a tightening buckle that is a part of and used in the assemblies described herein.

As discussed above, the ladder stabilizing assemblies may further include a first ground anchor clamp 24 (which holds the second end of the first cord 10; the second end of the second cord 12; and the first end of the fifth cord 18 together), such that all three cords 10/12/18 may be connected to the loop 42 on the top surface 40 of the first ground anchor 20 (FIG. 4). In such embodiments, the second end of the first cord 10; the second end of the second cord 12; and the first end of the fifth cord 18 may be connected (e.g., stitched, welded, glued, or otherwise connected together), with such cords 10/12/18 having a shared loop, clasp, hook, or other element that may be reversibly connected to the loop 42 on the top surface 40 of the first ground anchor 20 (FIG. 4). Likewise, the invention provides that second ground anchor clamp 26 holds the second end of the third cord 14; the second end of the fourth cord 16; and the second end of the fifth cord 18 together, which are then connected to the loop 42 on the top surface 40 of the second ground anchor 22. Such cords may be connected to the loop 42 in the same manner described above, e.g., through a shared loop, clasp, hook, or other element that may be reversibly connected to the loop 42 on the top surface 40 of the second ground anchor 22.

The invention provides that the first cord 10, second cord 12, third cord 14, a fourth cord 16, and fifth cord 18 may consist of ropes, chains, webbing materials, elastomer cords, bands (metallic and elastomer bands), and other suitable materials. The invention provides that the ground anchors 20/22; clamps 24/26; ladder connectors 28/30/32/34; and the rod 44 may be comprised of metals, steel, plastics, and/or other suitably rigid materials.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A ladder stabilizing assembly, which comprises:

(a) a first cord, a second cord, a third cord, a fourth cord, and a fifth cord;

(b) a first ground anchor and a second ground anchor;

(c) a first ground anchor clamp and a second ground anchor clamp;

(d) a first ladder connector, a second ladder connector, a third ladder connector, and a fourth ladder connector; and (e) a tightening buckle, wherein:

(i) a first end of the first cord is configured to be connected to a bottom portion of a right leg of a ladder through the first ladder connector; a second end of the first cord is configured to be connected and secured to the first ground anchor through the first ground anchor clamp; and the first ground anchor clamp is configured to be secured to a ground surface;

(ii) a first end of the second cord is configured to be connected to a top portion of the right leg of the ladder through the second ladder connector; a second end of the second cord is configured to be connected and secured to the first ground anchor through the first ground anchor clamp;

(iii) a first end of the third cord is configured to be connected to a bottom portion of a left leg of the ladder through the third ladder connector; a second end of the third cord is configured to be connected and secured to the second ground anchor through the second ground anchor clamp; and the second ground anchor clamp is configured to be secured to the ground surface;

(iv) a first end of the fourth cord is configured to be connected to a top portion of the left leg of the ladder through the fourth ladder connector; a second end of the fourth cord is configured to be connected and secured to the second ground anchor through the second ground anchor clamp; and (v) a first end of the fifth cord is configured to be connected and secured to the first ground anchor through the first ground anchor clamp and a second end of the fifth cord is configured to be connected and secured to the second ground anchor through the second ground anchor clamp, wherein the fifth cord includes the tightening buckle that is configured to manually tighten or loosen the fifth cord between the first ground anchor and the second ground anchor, wherein (x) each of the first ground anchor and second ground anchor include a corkscrew element that is configured to be rotated into the ground surface; and (y) each of the first ground anchor and second ground anchor include a top surface and a loop attached to the top surface; and (f) a rod that is configured to be disposed through the loop on the top surface of the each of the first ground anchor and the second ground anchor and manually rotated to assist in attaching the first ground anchor and the second ground anchor to the ground surface, wherein: (i) the first ground anchor clamp holds the second end of the first cord and the second end of the second cord together, which are both connected to the loop on the top surface of the first ground anchor; and (ii) the second ground anchor clamp holds the second end of the third cord and the second end of the fourth cord together, which are both connected to the loop on the top surface of the second ground anchor.

* * * * *